US006863249B1

(12) United States Patent
Alvord

(10) Patent No.: US 6,863,249 B1
(45) Date of Patent: Mar. 8, 2005

(54) DEVICE FOR HAULING GARBAGE BAGS

(76) Inventor: Brent H. Alvord, 4784 NW. 7th Manor, Coconut Creek, FL (US) 33063

( * ) Notice: Subject to any disclaimer, the term of this patent is extended or adjusted under 35 U.S.C. 154(b) by 0 days.

(21) Appl. No.: 10/445,511

(22) Filed: May 27, 2003

(51) Int. Cl.[7] .................................................. B60R 9/00
(52) U.S. Cl. ...................... 248/95; 248/304; 248/339; 248/208
(58) Field of Search ..................... 248/304, 95, 339, 248/208

(56) References Cited

U.S. PATENT DOCUMENTS

| 2,565,978 | A | * | 8/1951 | Meriwether | 248/327 |
|---|---|---|---|---|---|
| 2,609,104 | A | * | 9/1952 | Leach | 224/482 |
| 4,068,817 | A | * | 1/1978 | Berger | 248/340 |
| D272,518 | S | * | 2/1984 | Smith | D8/382 |
| 4,495,735 | A | * | 1/1985 | Elkins | 52/27 |
| 4,561,685 | A | * | 12/1985 | Fischer | 293/128 |
| 4,609,205 | A | * | 9/1986 | McKeever | 280/808 |
| 5,323,511 | A | * | 6/1994 | Gray | 16/422 |
| D348,962 | S | * | 7/1994 | Delery | D32/36 |
| 5,427,288 | A | * | 6/1995 | Trubee | 224/539 |
| 5,465,988 | A | * | 11/1995 | Dennis | 280/47.35 |
| D377,896 | S | * | 2/1997 | Mesna et al. | D8/367 |
| D382,464 | S | * | 8/1997 | McCoy et al. | D8/373 |
| 5,673,464 | A | * | 10/1997 | Whittaker | 24/301 |
| 5,676,284 | A | * | 10/1997 | Schenberg | 223/1 |
| 6,273,279 | B1 | * | 8/2001 | Wolf | 211/86.01 |
| D456,694 | S | * | 5/2002 | Allen et al. | D8/367 |
| D465,724 | S | * | 11/2002 | Goodman et al. | D8/367 |
| 2001/0046425 | A1 | * | 11/2001 | Vagnino | 410/101 |
| 2002/0145024 | A1 | * | 10/2002 | Schuster | 224/543 |
| 2003/0129038 | A1 | * | 7/2003 | Addy | 410/97 |

* cited by examiner

Primary Examiner—Leslie A. Braun
Assistant Examiner—Ingrid Weinhold
(74) Attorney, Agent, or Firm—Wyatt, Tarrant & Combs, LLP

(57) ABSTRACT

A device for hanging garbage bags on an exterior of a vehicle such as a car for hauling the garbage bags to a disposal area. The device includes a vehicle attachment member attached to a hook member via a strap. The vehicle attachment member has a base portion and a vehicle engagement arm extending from the base portion. The vehicle engagement arm is configured to hang over a door frame or open window of the vehicle and thereby removably suspend the vehicle attachment member on the vehicle. The hook member has a base portion and at least one garbage bag suspension arm extending from the base portion, the garbage bag suspension arm configured to securely suspend a garbage bag. The vehicle engagement arm of the vehicle attachment member and the garbage bag suspension arm of the hook member are preferably positioned on opposite sides of the strap.

5 Claims, 5 Drawing Sheets

DEVICE FOR HAULING GARBAGE BAGS

CROSS REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention relates to disposal of garbage, and more particularly to devices and methods for transporting trash bags for disposal.

BACKGROUND OF THE INVENTION

In contemporary culture, individuals and business establishments typically collect their trash in a garbage can or garbage basket that is lined with a plastic garbage bag. When the trash bags are full of trash, they are removed from the trash can and transported to a designated location to await pickup by a garbage disposal service. The garbage disposal service transports the garbage bags to a garbage disposal area, such as an incinerator or a garbage dump.

Garbage cans are typically located in a room where trash is generated, such as a kitchen, bathroom, or office. When the plastic garbage bag is full of garbage, the open top of the garbage bag can be tied shut in order to secure the garbage inside of the garbage bag. At the time of filing of this application, most garbage bags are provided with drawstrings that are threaded inside of a closed collar around the opening of the bag. Loops of the drawstrings protrude from the collar, and these loops can be tied together to secure the contents of the bag. If drawstrings are not provided, opposing edges of the bag can be tied to each other. To facilitate tying the edges of a bag together, some garbage bags are provided with extensions along the opening that can be tied to one another. An older method of securing garbage bag openings uses a twist-tie or a plastic locking strip to form a tight loop around the top of the garbage bag.

Once a filled garbage bag has been removed from the garbage can, it is necessary to bring the garbage bag to a trash disposal area for storage and eventual disposal. In some situations, the garbage bag is dropped into a large garbage bag holding container, where the bag is held until the next scheduled date of garbage pick up. Transportation of filled garbage bags is relatively simple for individuals who reside near the point of trash pickup. However, problems arise for individuals who reside far from the point of garbage pickup.

In apartment complexes, residents of the apartments are typically required to transport their garbage bags to a garbage dumpster for disposal. A dumpster is a large container that can hold a high volume of garbage and that is configured such that it can be readily emptied by a garbage truck. Once or twice a week, a garbage disposal service empties the garbage from the dumpsters and then transports the garbage to an off-site garbage disposal facility.

In large apartment complexes, the dumpsters may be located a significant distance from the apartments. Accordingly, residents of apartment complexes frequently use their individual vehicles to transport garbage bags from their apartment to the dumpster. A resident who owns a pickup truck can conveniently haul garbage bags in the bed of his or her truck. However, most residents own automobiles or sports utility vehicles ("SUV"). When hauling garbage bags with an automobile or SUV, the garbage bags must be transported either in the trunk, in the interior passenger compartment, or on top of the hood or roof of the vehicle. When trash bags are placed in the passenger compartment or trunk of a vehicle, there is a risk that trash or liquid will leak from the bag. Leakage may soil the vehicle or give the vehicle a foul odor.

When trash bags are placed on the hood or roof of a vehicle during transport, it is necessary to drive slowly and carefully so that the trash bags do not fall off of the vehicle. If a trash bag falls off of a vehicle, it will often split open when it strikes the ground, resulting in a mess or a dangerous condition (e.g. broken glass) that must be cleaned up. This problem occurs frequently in apartment complexes, where drivers often must navigate sharp turns and speed bumps on their route to the garbage dumpster. Some residents refuse to clean up their own messes, and this problem becomes more acute when a person is on a tight schedule at the time that they are transporting their garbage bags (e.g. heading to work or to a meeting).

Individuals who reside in rural areas experience similar problems when delivering garbage bags to a point of garbage collection. The point of garbage collection is typically the side of a public road. Such individuals often reside a quarter mile or more from the road, and may have to drive over bumps or through snow in order to reach the roadside, all of which can cause bags to fall over and soil the interior of a vehicle or fall off of a hood or roof.

There is thus a need for a device for use in hauling trash on a motor vehicle that has the following characteristics and advantages.

OBJECTS AND SUMMARY OF THE INVENTION

It is an object of the invention to provide a device for hanging garbage bags on an exterior of a passenger vehicle such as a car, truck, or sports utility vehicle for the purpose of hauling the garbage bags to a disposal area. It is another object of the invention to provide a device that is readily attachable to and removable from a door frame or partially open window of the passenger vehicle.

The device includes a vehicle attachment member and a hook member. The vehicle attachment member has a base portion and a vehicle engagement arm extending from the base portion. The vehicle engagement arm is configured to hang over a door frame or open window of the vehicle and thereby removably suspend the vehicle attachment member on the vehicle. The hook member has a base portion and at least one garbage bag suspension arm extending from the base portion, the garbage bag suspension arm configured to securely suspend a garbage bag. The base portion of the vehicle attachment member is attached to the base portion of the hook member via a strap. The vehicle engagement arm of the vehicle attachment member and the garbage bag suspension arm of the hook member are preferably positioned on opposite sides of the strap, such that when the vehicle attachment member is attached to the vehicle, the garbage bag suspension arm extends from the vehicle to thereby facilitate suspension of at least one garbage bag from the garbage bag suspension arm.

The vehicle engagement arm is preferably fixed at an acute angle relative to the base portion of the vehicle attachment member. In order to enhance the carrying capacity of the device, the hook member can be provided with a plurality of garbage bag suspension arms.

In a preferred embodiment, the garbage bag suspension arm is substantially U-shaped. In order to strengthen the garbage bag suspension arm, a brace member can be fixed on an upper surface of the garbage bag suspension arm. The brace member preferably has a pair of flat opposing outer walls, with each of the opposing outer walls intersecting the garbage bag extension arm at an angle of about 90 degrees. These features allow the garbage bag suspension arm to be formed from less material.

In order to minimize rotation of the device when the vehicle attachment member is removably attached to the vehicle, the vehicle attachment member preferably has a substantially flat profile. Likewise, the base portion of the hook member preferably has a substantially flat profile in order to minimize rotation or twisting of the hook member relative to the vehicle.

The device is used by attaching the device to a door frame or a partially open window of the passenger vehicle via the vehicle engagement arm of the vehicle attachment member such that the garbage bag suspension arm extends from the vehicle, then threading a loop of a garbage bag over the garbage bag suspension arm and allowing the loop to rest on the garbage bag suspension arm to thereby suspend the garbage bag on the vehicle. The vehicle is then driven to a garbage disposal area, the garbage bag is removed from the garbage bag suspension arm, and the garbage bag is discarded in the garbage disposal area. Upon discarding the garbage bag, the device can be detached from the vehicle and stored for future use.

The foregoing and other objects, features, aspects and advantages of the invention will become more apparent from the following detailed description of the invention when considered in conjunction with the accompanying drawings.

PREFERRED EMBODIMENTS OF THE INVENTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
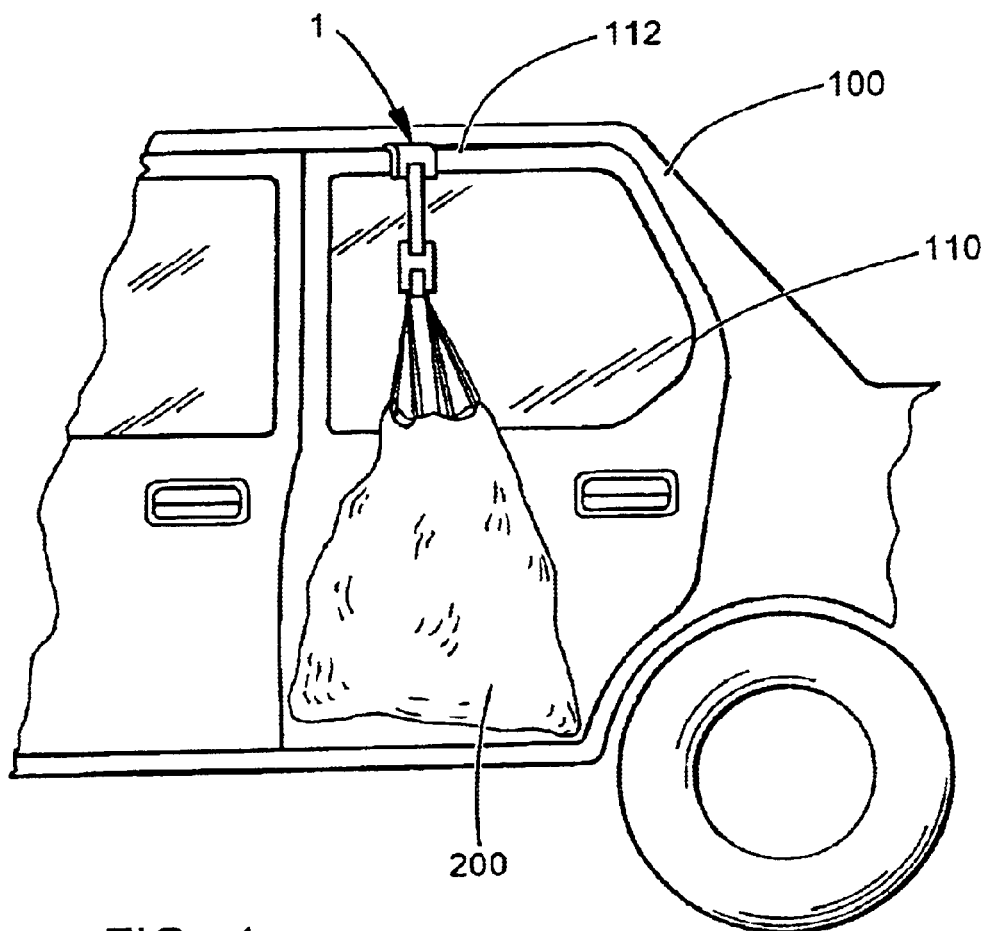
FIG. 1 is a front view of one preferred embodiment of the device of the invention, showing the device attached to a door of a passenger vehicle and a garbage bag suspended from the device.

As shown in FIG. 1, the present invention is for a device 1 for hanging garbage bags 200 on an exterior of a passenger vehicle 100 such as a car, truck, or sports utility vehicle for the purpose of hauling the garbage bags 200 to a disposal area, such as a dumpster. As explained in further detail below, the device 1 is readily attachable to and removable from a door frame 110 or a partially open window 120 (see FIG. 6) of the passenger vehicle 100. The device 1 is designed particularly for short trips to trash dumpsters, such as in apartment or condominium complexes, office or business complexes or any other environment in which people have to transport trash bags to a main dumpster or another collection point for disposal.

Figures 2, 3:
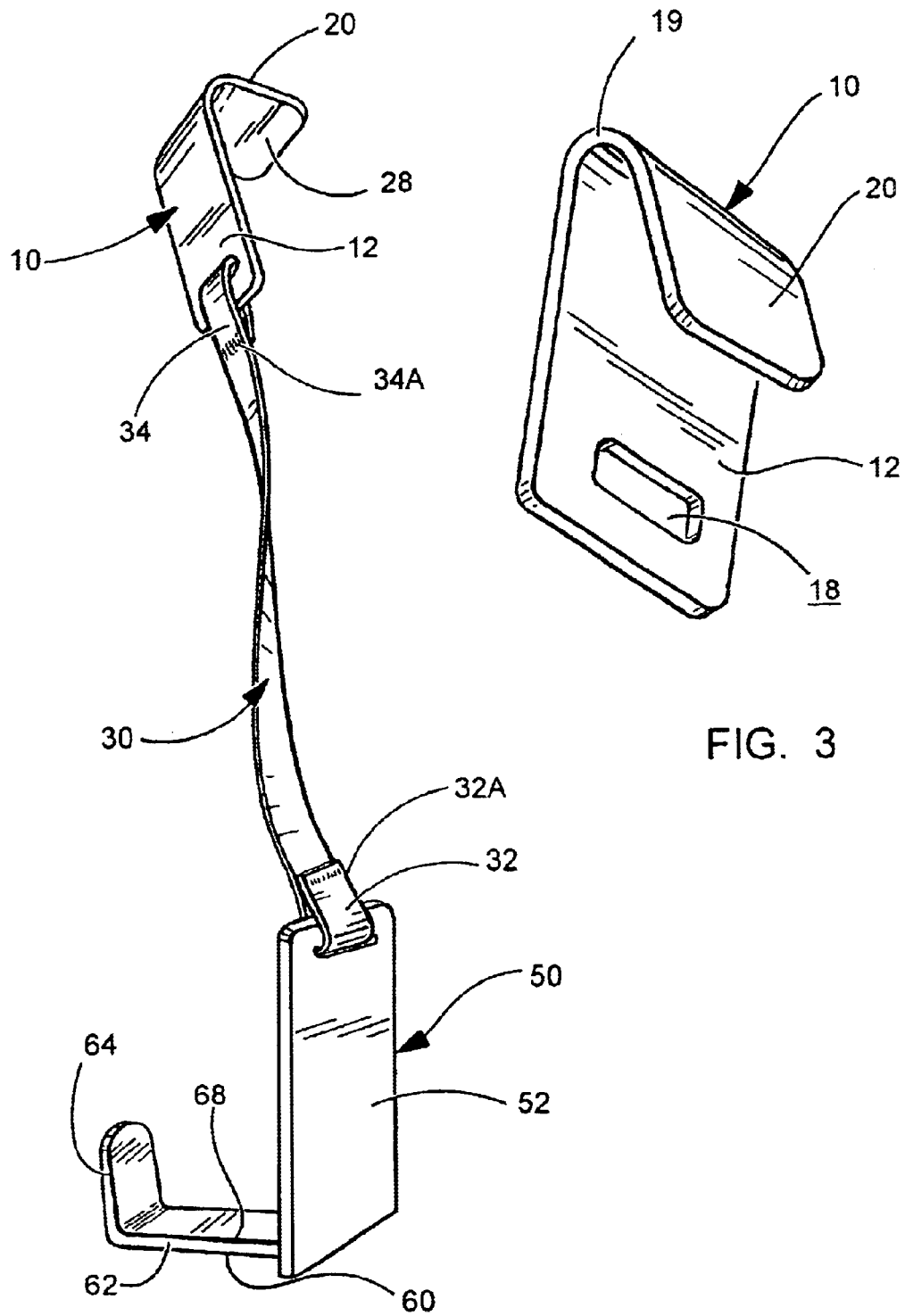
FIG. 2 is a side perspective view of one preferred embodiment of the invention.
FIG. 3 is a side perspective view of one preferred embodiment of the vehicle attachment member component of the invention.
Figure 4:
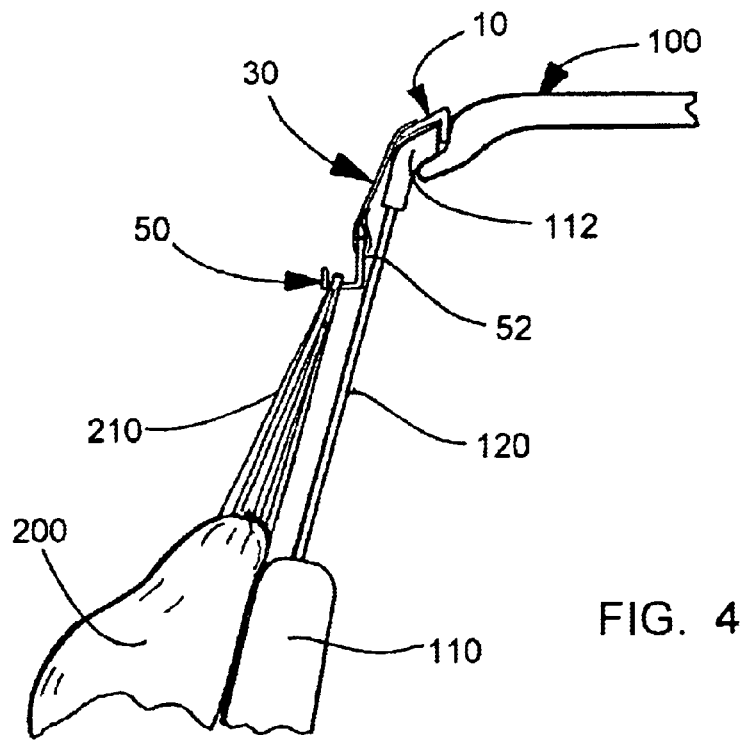
FIG. 4 is side view of one preferred embodiment of the invention, featuring a cross-section of a passenger compartment of a vehicle in order to demonstrate attachment of the device to the door of a vehicle.
Figure 6:
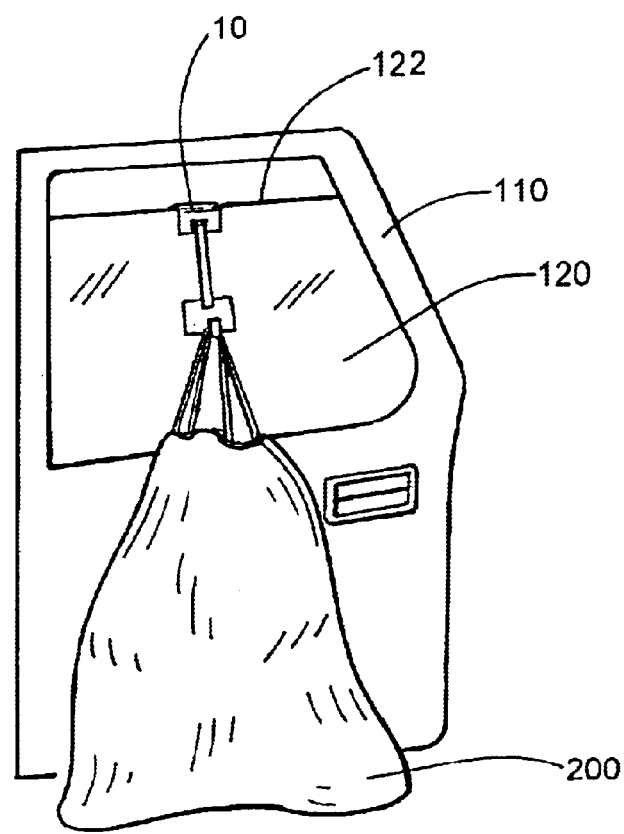
FIG. 6 is front view of one preferred embodiment of the invention showing the device suspended from a partially open window of a passenger vehicle.

As shown in FIG. 2, the device of the invention comprises, generally, a vehicle attachment member 10, a hook member 50, and a strap 30. The strap 30 joins the vehicle attachment member 10 to the hook member 50. As shown in FIG. 2, a vehicle engagement arm 20 of the vehicle attachment member 10 and a garbage bag suspension arm 60 of the hook member 50 are preferably positioned on opposite sides of the strap 30, such that when the vehicle attachment member 10 is attached to the vehicle, the garbage bag suspension arm 60 extends from the vehicle to thereby facilitate suspension of at least one garbage bag from the garbage bag suspension arm, in the manner shown in FIG. 4. As shown in FIG. 4, the device 1 can be hung from the door frame 110 in the juncture between the top 112 of the door 110 and the dooxjamb of the vehicle. As shown in FIG. 6, the device 1 can also be hung from the top 122 of a partially rolled down window 120.

As shown in FIG. 2, the vehicle attachment member 10 has a base portion 12. A vehicle engagement arm 20 having underside 28 extends from the base portion 12. As shown most clearly in FIGS. 4 and 6, the vehicle engagement arm 20 is configured to hang over a door frame or open window of the vehicle and thereby removably suspend the vehicle attachment member 10 on the vehicle.

Figure 8:
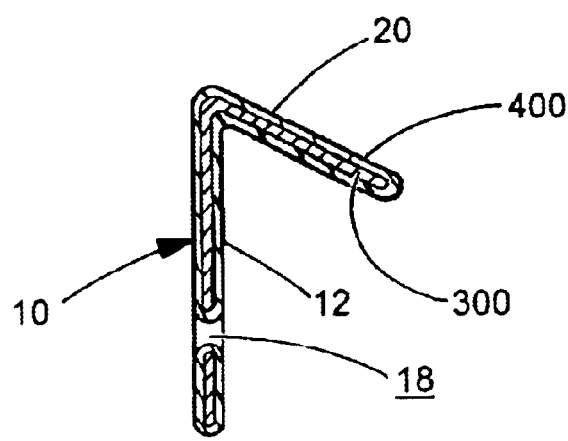
FIG. 8 is a side cross section of one preferred embodiment of the vehicle attachment member of the device of the invention, showing an embodiment in which the solid frame of the device is coated in a deformable plastic or rubber coating.

In a preferred embodiment shown in FIGS. 4 and 8, the base portion 12 of the vehicle attachment member 10 has a substantially flat profile when viewed from the side. The flat profile of the base portion 12 assists in minimizing rotation or twisting of the vehicle attachment member 10 when the vehicle attachment member is removably attached to a vehicle 100. As shown in FIG. 3, the base portion 12 preferably has a substantially horizontal slot 18 through a lower portion thereof. The slot 18 is used to attach the base portion 12 of the vehicle attachment member 10 to the strap 30.

As shown in FIG. 3, the vehicle engagement arm 20 preferably extends laterally from an inner upper end of the base portion 12. As indicated in FIG. 3, the vehicle engagement arm 20 is fixed at an acute angle relative to the base portion 12. The acute angle between the base portion 12 and the vehicle engagement arm 20 is preferably between about 30 to 45 degrees. Like the base portion 12, the vehicle engagement arm 20 preferably has a substantially flat profile. The flat profile of the vehicle engagement arm 20 assists in minimizing rotation or twisting of the vehicle attachment member 10 when the vehicle attachment member 10 is removably attached to the vehicle.

The vehicle attachment member 10 is preferably about 3 inches long, about 2 inches wide, and about 0.125 inch thick. The vehicle engagement arm 20 is preferably about 0.5 inch long. The vehicle attachment member aperture 18 is preferably about 1.25 inches long and about 0.125 inch wide.

Figure 5:
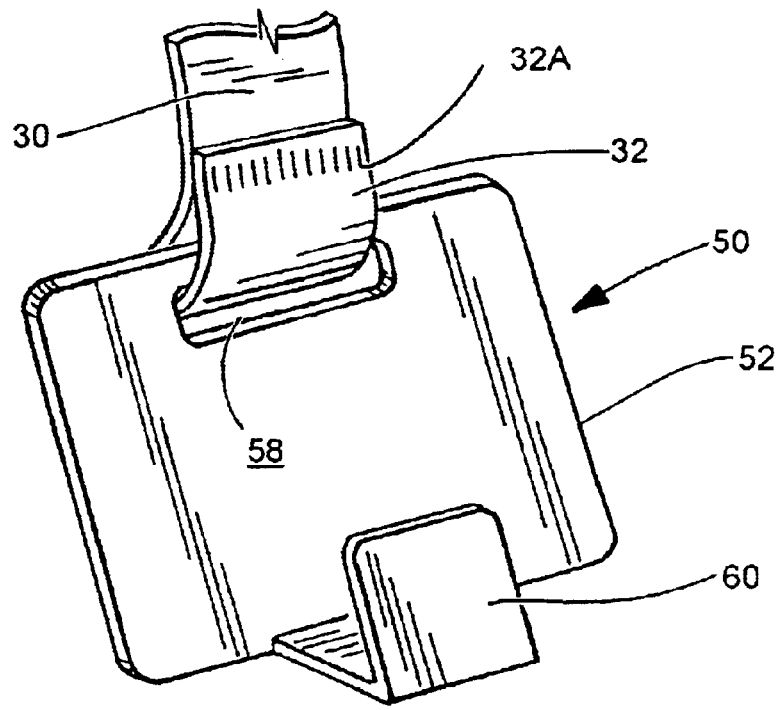
FIG. 5 is a front-side perspective view of one preferred embodiment of the hook member component of the invention.

As shown in FIG. 5, the hook member 50 has a base portion 52. A garbage bag suspension arm 60 extends from the base portion 52. As shown most clearly in FIGS. 4 and 6, the hook member 50 is configured and positioned such that when the device 1 is attached to a vehicle 100, the garbage bag suspension arm 60 extends outward from the vehicle 100 for use in suspending garbage bags 200 from the device 1.

Figure 7:
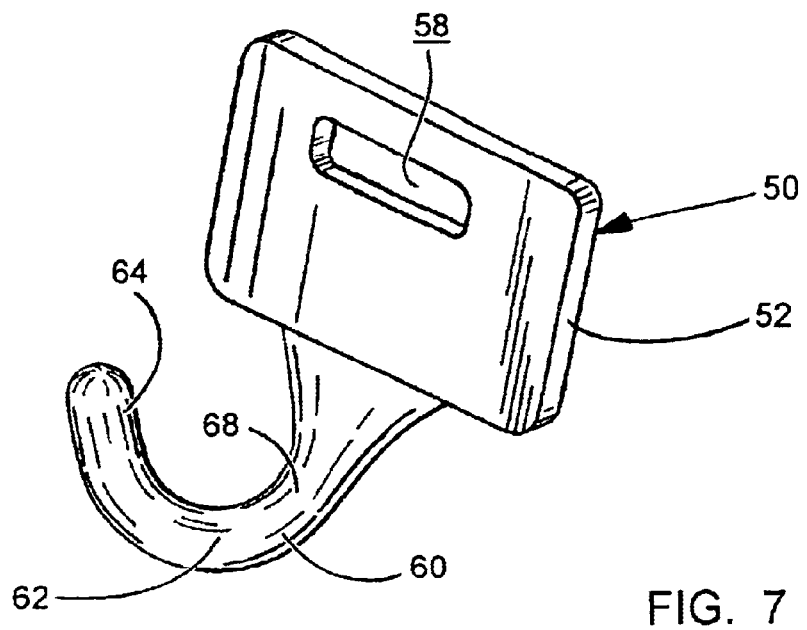
FIG. 7 is a side perspective view of one alternative preferred embodiment of the hook member component of the invention.

In a preferred embodiment shown in FIG. 2, the base portion 52 has a substantially flat profile. The flat profile of the base portion 52 of the hook member 50 minimizes rotation of the hook member when the vehicle attachment member 10 is removably attached to the vehicle. As shown in FIGS. 5 and 7, the base portion 52 of the hook member 50 has a substantially horizontal slot 58 through an upper portion thereof. The slot 58 is used to attach the base portion 52 of the hook member 50 to the strap 30. The base portion 52 of the hook member 50 is preferably about 1.25 inches in height, about 3 inches wide, and about 0.125 inch thick. The hook member aperture 58 of the base portion 52 is preferably about 1.25 inches long and about 0.125 inch wide.

The garbage bag suspension arm 60 is configured to securely suspend a garbage bag, in the manner shown FIGS. 1, 4 and 6. In order to achieve secure suspension, the garbage bag suspension arm 60 is preferably substantially U-shaped (one embodiment of which is shown in FIG. 7) or L-shaped (one embodiment of which is shown in FIG. 2). In the preferred embodiment shown in FIG. 2, the garbage bag suspension arm 60 has a support portion 62 extending substantially laterally from an outer lower end of the base portion 52 of the hook member 50. The support portion 62 of the suspension arm 60 terminates in an upwardly extending catch member 64. FIG. 7 shows an alternative preferred embodiment in which the garbage bag suspension arm 60 is configured as a J shaped hook member that merges into the base portion 52.

Figure 9:
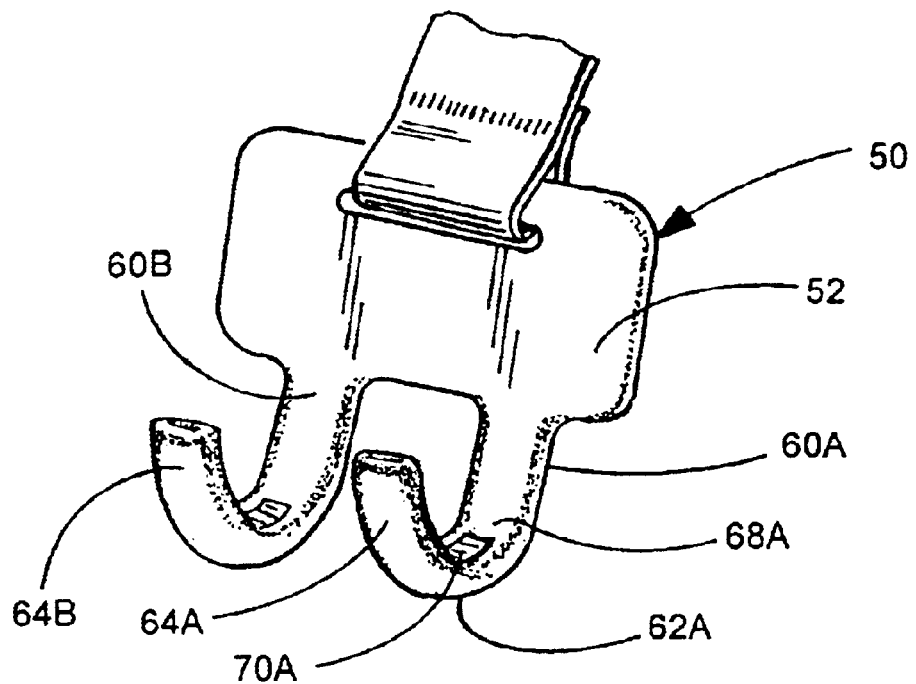
FIG. 9 is a perspective view of one preferred embodiment of the hook member component of the invention having a plurality of garbage bag extension arms.

In an alternative embodiment shown in FIG. 9, the hook member 50 has a plurality of garbage bag suspension arms 60A, 60B extending from the base portion 52 of the hook member 50. Although two suspension arms 60A, 60B are shown in FIG. 9, additional arms 60 may be provided.

Figure 10:
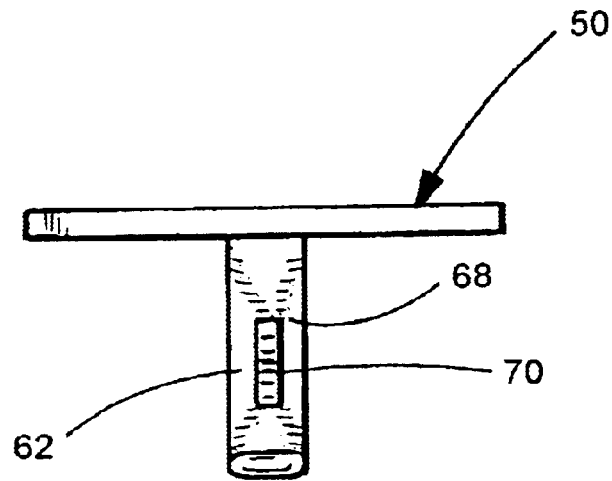
FIG. 10 is a top view of one preferred embodiment of the hook member component of the invention, showing a preferred embodiment of a brace member on the garbage bag suspension arm.

FIG. 9 also shows a preferred embodiment in which the garbage bag extension arm 60 is a U-shaped member that has a flattened profile when viewed from the side. The garbage bag suspension arms 60A, 60B include upwardly extending catch members 64A. 64B. In the embodiment of FIG. 9, a curved upper surface 68A of the laterally extending support portion 62A is provided with a brace member 70A. FIG. 10 provides a top side view of a preferred embodiment of a brace member 70 fixed on upper surface 68 of the garbage bag suspension arm 60. The brace member 70 assists in retaining the upward extension 64 of the garbage bag suspension arm 60 in position when under the weight of a garbage bag 200. As can be seen most clearly in FIG. 10, the brace member 70 preferably has a flattened profile, the outer walls of which intersect the garbage bag extension arm 60 at an angle of about 90 degrees. The brace member 70 is preferably formed as an integral part of the garbage bag suspension arm 60. The use of a brace member 70 allows the suspension arm 60 to have a flatter profile, which uses less material. The brace member 70 also allows the hook member to be formed from plastics having less strength and rigidity, which decreases costs of manufacture.

As shown in FIG. 2, the base portion 12 of the vehicle attachment member 10 is attached to the base portion of the hook member 50 via the strap 30. The strap 30 is preferably about 1 inch wide and preferably between about 2 to 6 inches in length between the vehicle attachment member 10 and the garbage bag suspension member 50. In a preferred embodiment, the strap 30 is 2 inches in length between the vehicle attachment member 10 and the garbage bag suspension member 50. The strap 30 is preferably a pliable or flexible material. A nylon webbing or weave material is particularly suited for the strap 30, because such materials are inexpensive, strong and durable. The pliable strap 30 allows the device to be readily stored in a small compartment, such as a glove box, until it is needed again. The pliable strap 30 also allows the inner side of the hook member 50 to rest freely against the window 120 of the vehicle 100 regardless of the particular configuration of the vehicle. With the inner side of the base portion 52 of the hook member 50 resting against the window in this manner, the width of the base portion 52 retards or prevents the hook member 50 from twisting side-to-side. Furthermore, the strap 30 absorbs upward forces on the hook member 50, such as those encountered when the vehicle passes over bumps, which minimizes or eliminates the likelihood of the vehicle attachment member 10 being pushed upwards and thereby detached from the vehicle.

In an alternative embodiment, the vehicle attachment member to and the hook member 50 can be fixedly attached directly to one another. This embodiment eliminates the strap portion 30, and is thus simpler and less expensive to manufacture. However, the strapless embodiment lacks the foregoing advantages. In the strapless embodiment, the device 1 can be molded or otherwise formed as a unitary body having no separate parts.

In a preferred embodiment shown in FIGS. 2 and 5, closed loops are used to secure the strap 30 on the vehicle attachment member 10 and the hook member 50. As shown in FIG. 2, an upper end 34 of the pliable strap 30 is threaded through the slot 18 of the vehicle attachment member 10. The upper end 34 of the strap 30 is then fixedly attached to the strap 30 to thereby form a closed upper loop. The closed upper loop thus secures the vehicle attachment member on the upper end 34 of the strap 30. As shown in FIGS. 2 and 5, a lower end 32 of the pliable strap 30 is threaded through the slot 58 of the hook member 50 and fixedly attached to the pliable strap 30 to thereby form a closed lower loop. The closed lower loop thus secures the hook member 50 on the lower end 32 of the strap 30. A securing means 32A, 34A, such as threading, melted nylon, or glue, is used to secure the ends 32, 34 to the strap 30. Alternatively, a releasable securing means 32A, 34A, such as velcro, buckles, snaps, buttons or the like can be used, provided that the releasable securing means 32A, 34A is sufficiently strong to withstand the forces generated during transport of garbage bags 200 on a vehicle 100.

In a preferred embodiment, the vehicle attachment member 10 and the garbage bag engagement member 50 are each a unitary body that is molded from plastic. In an alternative embodiment shown in FIG. 8, the vehicle attachment member 10 and the garbage bag engagement member 50 are made from metal 300 and have a deformable plastic or rubber coating 400. The coating 400 prevents the device 1 from damaging the exterior of the vehicle 100.

In operation, the device 1 of the invention is used by attaching the device 1 to a door frame 112 or a partially open window 120 of a passenger vehicle 100. The device 1 is attached to the vehicle 100 via the vehicle engagement arm 20 of the vehicle attachment member 10 such that the garbage bag suspension arm 60 extends from the vehicle 100, in the manner shown particularly in FIG. 4. A loop of a garbage bag 200 is then threaded over the garbage bag suspension arm 60 of the hook member 50. As shown in FIG. 4, the loop is preferably formed by drawstrings 210, but the loop can also be formed by tying opposing edges of a bag 200 together. The loop of the garbage bag 200 is allowed to rest on the garbage bag suspension arm 60, such that the garbage bag 200 is suspended on the vehicle in the manner shown in FIGS. 1, 4 or 6.

Once the garbage bag 200 is suspended on the vehicle 100, the vehicle is driven to a garbage disposal area, such as a dumpster. Due to the configuration of the device 1, there is little or no possibility that the garbage bag 200 will slip off of the device 1 during transport, thus avoiding many of the problems associated with prior art methods of transporting garbage bags on passenger vehicles. When the vehicles reaches to the garbage disposal area, the garbage bag 200 is removed from the garbage bag suspension arm 60 and discarded in the garbage disposal area.

The configuration of the device 1 allows it to be readily detached from the vehicle 100 once the garbage bag 200 has been removed. Detachment is accomplished simply by lifting up on the vehicle attachment member 10 until it clears the top 112 of the door 110 or the top 122 of the glass 120 of the partially open window 120. This feature is important, because during garbage disposal, individuals typically want as little hassle as possible. Additionally, once garbage has been disposed of, individuals typically prefer that their vehicle return to its normal appearance, i.e. without unnecessary or unsightly peripheral attachments, so that the vehicle presents a conventional appearance when driven to work, business meetings, or social engagements.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A method of hauling a garbage bag to a disposal area such as a garbage dumpster or a road-side drop off point, the method comprising:

providing a passenger vehicle such as a car, truck, or sports utility vehicle, providing a device for hauling garbage bags, said device having a vehicle attachment member said vehicle attachment member comprising a base portion, said base portion having a substantially flat profile, said flat profile of said base portion assisting in minimizing rotation or twisting of said vehicle attachment member when said vehicle attachment member is removably attached to the vehicle, a vehicle engagement arm, said engagement arm extending laterally from an inner upper end of said base portion, said vehicle engagement arm fixed at an acute angle relative to said base portion, said vehicle engagement arm having a substantially flat profile, said flat profile of said vehicle engagement arm assisting in minimizing rotation or twisting of said vehicle attachment member when said vehicle attachment member is removably attached to the vehicle, and said base portion having a substantially horizontal slot through a lower portion thereof;

a hook member for suspending a garbage bag, said hook member comprising a hook member base portion, said hook member base portion having a substantially flat profile, said flat profile of said hook member base portion minimizing rotation of said hook member when said vehicle attachment member is removably attached to the vehicle, at least one garbage bag suspension arm extending from said hook member base portion, said garbage bag suspension arm having a support portion extending substantially laterally from an outer lower end of said hook member base portion, said suspension arm terminating in an upwardly extending catch member, and said base portion of said hook member having a substantially horizontal slot through an upper portion thereof;

a pliable strap, an upper end of said pliable strap threaded through said slot of said vehicle attachment member and fixedly attached to said pliable strap to thereby form a closed upper loop, said upper loop thereby securing said vehicle attachment member on said upper end of said strap, a lower end of said pliable strap threaded through said slot of said hook member and fixedly attached to said pliable strap to thereby form a closed lower loop, said lower loop thereby securing said hook member on said lower end of said strap, and said vehicle engagement arm of said vehicle attachment member and said garbage bag suspension arm of said hook member positioned on opposite sides of said pliable strap, such that when said vehicle attachment member is attached to the vehicle and said pliable strap is in an untwisted configuration, said garbage bag suspension arm extends from the vehicle to thereby facilitate suspension of at least one garbage bag from said garbage bag suspension arm attaching the device to a door frame or a partially open window of the passenger vehicle via the vehicle engagement arm of the vehicle attachment member such that the garbage bag suspension arm extends from the vehicle, threading a loop of a garbage bag over said garbage bag suspension arm and allowing the loop to rest on the garbage bag suspension arm to thereby suspend the garbage bag on the vehicle, driving the vehicle to the garbage disposal area, removing the garbage bag from the garbage bag suspension arm, and discarding the garbage bag in the garbage disposal area.

2. The method of claim 1, further comprising, upon discarding the garbage bag, detaching the device for hauling garbage from the vehicle.

3. The device of claim 1, wherein said garbage bag suspension arm is substantially U-shaped.

4. The device of claim 3, further comprising a brace member fixed on an upper surface of said garbage bag suspension arm, said brace member positioned and configured to assist in retaining said upward extension of said garbage bag suspension arm in position.

5. The device of claim 4, wherein said brace member has a pair of flat opposing outer walls, each of said opposing outer walls intersecting said garbage bag suspension arm at an angle of about 90 degrees.

* * * * *